United States Patent
Mohr (10) Patent No.: US 10,259,364 B2
(45) Date of Patent: Apr. 16, 2019

(54) SIMPLIFIED VEHICLE SEAT PROTECTION FILM AND METHOD FOR PRODUCING THE SAME

(71) Applicant: Horn & Bauer GmbH & Co. KG, Schwalmstadt (DE)

(72) Inventor: Thomas Mohr, Neustadt-Momberg (DE)

(73) Assignee: HORN & BAUER GMBH & CO. KG, Schwalmstadt (DE)

( * ) Notice: Subject to any disclaimer, the term of this patent is extended or adjusted under 35 U.S.C. 154(b) by 206 days.

(21) Appl. No.: 15/428,559

(22) Filed: Feb. 9, 2017

(65) Prior Publication Data
US 2017/0232875 A1 Aug. 17, 2017

(30) Foreign Application Priority Data
Feb. 12, 2016 (EP) .................................. 16155462

(51) Int. Cl.
*B60N 2/60* (2006.01)

(52) U.S. Cl.
CPC ............. *B60N 2/60* (2013.01); *B60N 2/6009* (2013.01)

(58) Field of Classification Search
CPC ....... A47C 31/10; A47C 31/11; A47C 21/002; A47C 27/002; A47G 9/0253; B60N 2/60; B60N 2/6009
USPC ........................ 150/158, 154; 297/229, 228.1
See application file for complete search history.

(56) References Cited

U.S. PATENT DOCUMENTS

| | | | | |
|---|---|---|---|---|
| 4,883,701 A | * | 11/1989 | Rankin | A47C 31/11 428/136 |
| 5,275,463 A | * | 1/1994 | Rocha | A47C 31/11 297/188.01 |
| 5,709,431 A | * | 1/1998 | Horn | B60N 2/6063 297/219.1 |
| 6,036,260 A | * | 3/2000 | Mullen | B60N 2/6036 2/69.5 |

(Continued)

FOREIGN PATENT DOCUMENTS

DE     36 01 390 C1     8/1987
DE     196 18 814 A1    11/1997
(Continued)

OTHER PUBLICATIONS http://www.slipngrip.com/SlipNGrip_Seat_Covers/FG-P9943-SC.html, (Webpage Slip-N-Grip Seat Cover Jan. 8, 2016).
(Continued)

*Primary Examiner* — Fenn C Mathew
*Assistant Examiner* — Cynthia F Collado
(74) *Attorney, Agent, or Firm* — Thomas | Horstemeyer, LLP (57) ABSTRACT

The invention relates to a vehicle seat protection film (1). The vehicle seat protection film (1) is produced from a tube-like plastic film, which has a thickness of less than 80 μm. Over the entire longitudinal extension between an open lower edge (29) and an at least partially closed upper edge (30) the cross-section of the tube-like plastic film is not closed in circumferential direction.

The vehicle seat protection film (1) according to the invention is employed for protecting a vehicle seat during mounting of the vehicle at a car manufacturer, during a transport or in repair shops.

16 Claims, 7 Drawing Sheets

(56) References Cited

U.S. PATENT DOCUMENTS

| | | | | |
|---|---|---|---|---|
| 6,048,026 A * | 4/2000 | Barnett | ................. | A47C 31/11 |
| | | | | 297/229 |
| 6,481,793 B1 | 11/2002 | Horn | | |
| 7,677,661 B1 * | 3/2010 | Ferrari-Cicero | ..... | B60N 2/2812 |
| | | | | 297/219.12 |
| 7,878,588 B2 * | 2/2011 | Snedeker | ............... | A47C 31/11 |
| | | | | 297/218.1 |
| 2009/0322129 A1 * | 12/2009 | Rodill | ...................... | A47C 1/14 |
| | | | | 297/229 |
| 2010/0001565 A1 * | 1/2010 | Gray | ........................ | A47C 7/62 |
| | | | | 297/229 |
| 2015/0175043 A1 * | 6/2015 | Tabbert | .................... | B60N 2/58 |
| | | | | 297/188.01 |

FOREIGN PATENT DOCUMENTS

| | | |
|---|---|---|
| DE | 199 23 889 C2 | 10/2003 |
| EP | 0 230 225 A2 | 1/1987 |
| EP | 2 008 886 B1 | 6/2008 |
| EP | 2 189 331 A1 | 11/2009 |
| EP | 2 314 476 B1 | 10/2010 |
| EP | 2 913 224 B1 | 2/2014 |
| GB | 2 185 391 A | 7/1987 |

OTHER PUBLICATIONS http://www.gammaplast.com/public/download/scheda_1_coprisedili_001.pdf, (Gammaplast brochure "standard seat covers").

* cited by examiner

SIMPLIFIED VEHICLE SEAT PROTECTION FILM AND METHOD FOR PRODUCING THE SAME

CROSS REFERENCE TO RELATED APPLICATIONS

This application claims priority to co-pending European Patent Application No. EP 16 155 462.1 filed Feb. 12, 2016.

FIELD OF THE INVENTION

Vehicle seat protection films serve for avoiding soiling of a vehicle seat, for example by assembly operators, other persons or dirt from the environment. For example, vehicle seat protection films are employed to avoid a soiling of the vehicle seat at the manufacturer of the vehicle seat and in delivery of the vehicle seat to the car factory. During assembly of the vehicle, too, a multiplicity of assembly workers one after the other comes into contact with the vehicle seats, so that also during assembly the vehicle seat has to be protected by a vehicle seat protection film. Finally, the completely assembled vehicle has to be driven off the conveyor belt, driven onto freight vehicles or railway wagons and eventually handled multiple times at the vehicle retailer until the vehicle can be delivered into the hands of the buyer in a state as clean as possible. From the construction of the vehicle seat at the supplier to the delivery of the vehicle to the buyer, the vehicle seat possibly has contact with assembly operators or other persons for 30 to 35 times, so that there is a considerable danger of soiling, which is intended to be avoided using a vehicle seat protection film. Vehicle seat protection films are e.g. also used in automobile repair shops when an inspection or repair is carried out on vehicles.

BACKGROUND OF THE INVENTION

Vehicle seat protection covers are known for example from the documents DE 199 23 889 C2 (corresponding to U.S. Pat. No. 6,481,793 B1), EP 2 314 476 B1, DE 36 01 390 C1 (corresponding to GB 2 185 391 A), EP 2 008 866 B1 and EP 2 913 224 B1. These vehicle seat protection covers are double-layered with a front layer and a back layer. The back layer has an upper pocket part and a lower pocket part which can be unconnected or connected to each other by side connection strips of the back layer. The upper pocket part and the lower pocket part of the back layer form an upper pocket and a lower pocket with the front layer, which in a cross-section are configured with a closed edge or boundary (in the following "edge"). To fix the vehicle seat protection cover to the vehicle seat, the vehicle seat protection cover can be slid onto the upper end portion of the backrest with the upper pocket and slid onto the front end portion of the seat cushion with the lower pocket. Possibly an additional fixing of the vehicle seat protection cover to the vehicle seat is achieved through the side strips of the back layer. The dimensions of the vehicle seat protection cover and especially of the upper pocket are dimensioned such that within the upper pocket also a headrest of the vehicle seat can be additionally accommodated (in addition to the upper end portion of the backrest of the vehicle seat).

Furthermore, vehicle seat protection films are known which have only an upper pocket without a lower pocket being present. Below the upper pocket such a vehicle seat protection film can be laid loosely onto the seat area formed by the vehicle seat and the seat cushion, where the vehicle seat protection film then is dimensioned such that it can protect the vehicle seat also to the side of the seat cushion and in front of the seat cushion.

Figure 1:
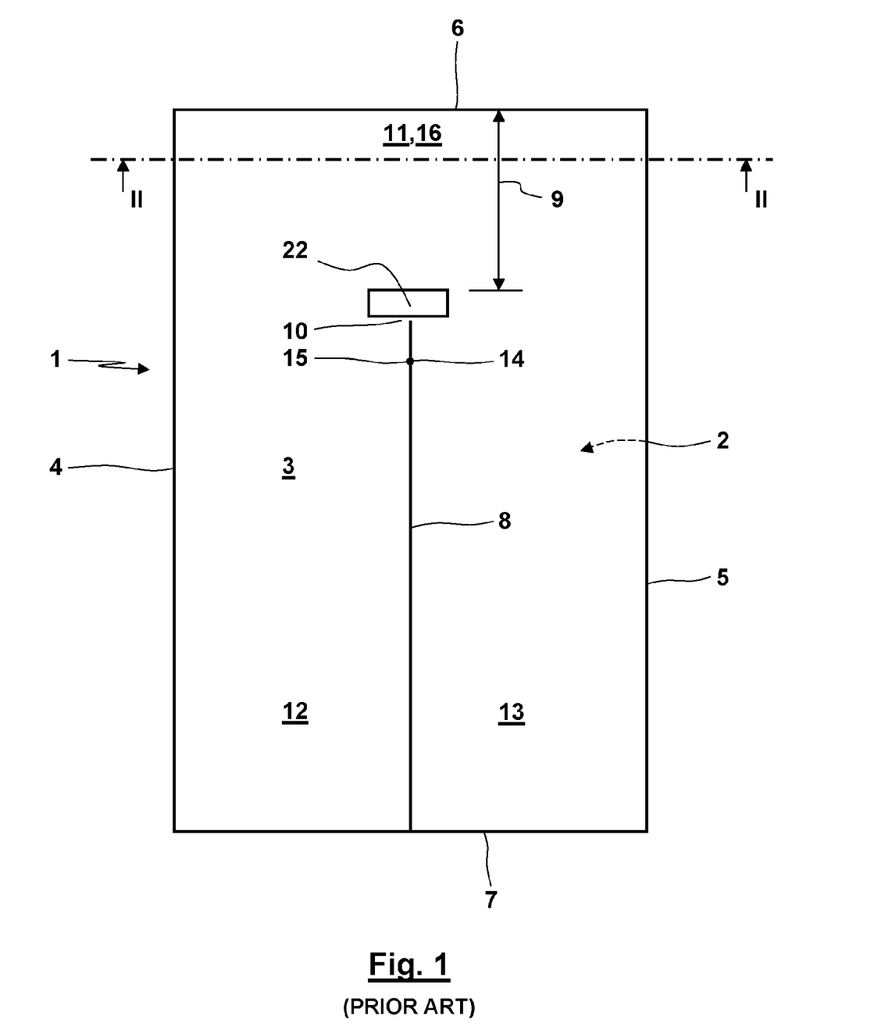
FIG. 1 shows a top view onto a vehicle seat protection film according to prior art.
Figure 2:
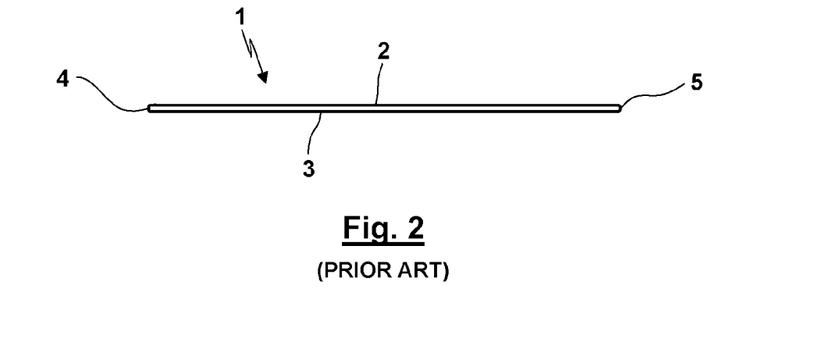
FIG. 2 shows a cross-section II-II through the vehicle seat protection film according to prior art according to FIG. 1.
Figure 3:
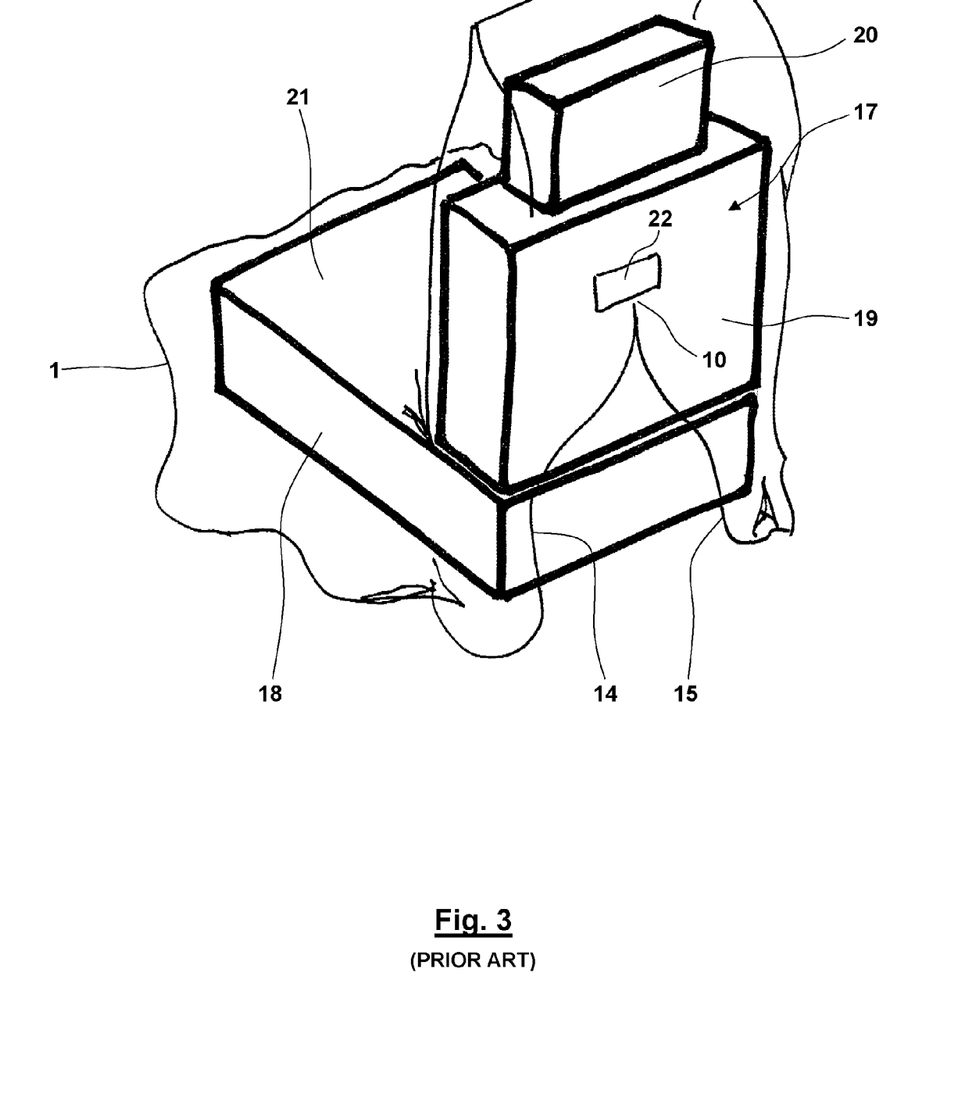
FIG. 3 shows (strongly schematized in a 3D representation from the back) a vehicle seat protection film according to FIGS. 1 and 2 according to prior art applied to a vehicle seat.

FIGS. 1 to 3 show a vehicle seat protection film 1 according to prior art. The vehicle seat protection film 1 in a flattened state has a front layer 2 and a back layer 3. The front layer 2 is connected to the back layer 3 in the region of the side edges 4, 5 and in the region of the upper edge 6, while these are not connected in the region of the lower edge 7. The back layer 3 has a non-continuous incision 8 originating from the lower edge 7, which is oriented in parallel to the edges 4, 5 in the direction of the longitudinal axis and which ends at a distance 9 from the upper edge 6 in an incision end 10. Therefore, the vehicle seat protection film 1 according to prior art has an upper end portion 11, in which the vehicle seat protection film 1 according to FIG. 2 is tubular and has a closed edge in a circumferential direction. In contrast, the vehicle seat protection film 1 remote from the upper end portion 11 forms a slit tube which in the circumferential direction is not closed due to the incision 8, therefore has an open edge. On both sides of the incision 8, the back layer 3 forms strip-like back layer parts 12, 13. The edges 14, 15 of the back layer parts 12, 13 oriented towards each other can be moved away from each other so that the tube may be opened here and (at a sufficient distance from the incision end 10) the back layer parts 12, 13 may be pulled apart or unfolded, in which way then the front layer 2 together with the folded part regions of the back layer parts 12, 13 may form a flat film. The upper end portion 11, in contrast, forms a closed upper pocket 16. FIG. 3 in a strongly schematized form shows the use of the vehicle seat protection film 1 for a vehicle seat 17. The vehicle seat 17 has a seat cushion 18, a backrest 19 and a headrest 20. The upper side or front side, whichever is applicable, of the seat cushion 18 and the backrest 19 together form a seat area 21. It can be seen that the vehicle seat protection film 1 is pulled onto the upper end portion of the backrest 19 with the upper pocket 16, in which way the headrest 20 is also located in the upper pocket 16. Remote from the upper end portion 11, the edges 14, 15 in the area of the incision 8 are (expressed in a strongly simplified way) opened in a V-shape and the part region of the vehicle seat protection film resulting below the incision end 10 is laid onto the seat area 21 similar to a flat film. Superfluous film areas hang from the seat cushion 18 also at the side boundaries of the seat cushion 18. The incision end 10 is located in the region of the backrest 19 and below the upper end portion of the backrest 19. To avoid tearing of the vehicle seat protection film 1 during pulling of the vehicle seat protection film 1 onto the backrest 19 and during spreading apart of the edges 14, 15, the vehicle seat protection film 1 is reinforced with a reinforcing element 22 hindering the advancement of a tear in the region of the incision end 10.

Vehicle seat protection films 1 according to prior art as explained before can especially be taken from the web addresses http://www.slipngrip.com/SlipNGrip_Seat_Covers/FG-P9943-SC.html http://www.gammaplast.com/public/download/scheda_1_coprisedili_001.pdf.

DE 196 18 814 A1 discloses a method for producing a vehicle seat protection cover. The vehicle seat protection cover forms an upper pocket and a lower pocket. The upper pocket is designated for providing that it is possible to pull the vehicle seat protection cover over a backrest of the vehicle seat from above, while the lower pocket is designated to be pulled over a seat cushion of the vehicle seat from the front. The production of the vehicle seat protection cover is done by using a film tube which (after making a continuous incision in the back layer) is spread in such a way that between the upper pocket and the lower pocket in the region of the back layer a slit results. The upper edge of the upper pocket and the lower edge of the lower pocket are formed by folds of the tube, while the pockets are closed on the side by weld seams. In the film tube provided via a roll several vehicle seat protection covers connected to each other by perforations and oriented transverse to the longitudinal extension of the film tube are produced.

According to EP 0 230 225 A2 (corresponding to GB 2 185 391 A), a vehicle seat protection cover with an upper pocket and a lower pocket or only with an upper pocket can be produced. Here, the upper pocket with closed boundaries is to be pulled over a backrest.

EP 2 189 331 A1 discloses a vehicle seat protection cover made of a film tube, in which the front layer and the back layer in the region of an upper edge are welded together while the film tube is open in the region of the lower edge. A longitudinal slit extends over a central part region of the back layer. Above the longitudinal slit an upper pocket closed upwards via the weld seam with an edge closed in cross-section is formed while below the longitudinal slit a lower pocket is formed which in cross-section has closed a closed edge and which is open downwards.

SUMMARY OF THE INVENTION

It is the object of the present invention to provide a vehicle seat protection film and a method for producing the same which is improved especially with regard to
  the amount of material involved,
  the necessary work steps for its manufacture,
  its multifunctional employability,
  its recyclability and purity of material,
  its employability for vehicle seats of differing dimensions,
  the effort for a transport and/or a storing,
  the effort for an application of the vehicle seat protection film onto the vehicle seat and for its removal,
  its characteristics in use,
  its tear resistance and/or
  the cost of production.

According to the present invention, the object of the invention is solved by the features of the independent claims. Additional preferred embodiments according to the invention are to be seen in the dependent claims.

According to the invention, the vehicle seat protection film is made from a plastic film, which (at least for the final product) can in rough approximation be described as "tube-like". The thickness of the plastic film can e.g. be less than 80 µm (especially less than 50 µm, less than 30 µm or even less than 15 µm).

The vehicle seat protection film according to the invention has a headrest part and a seat area part. The headrest part covers a headrest when the vehicle seat protection film is mounted to a vehicle seat. The headrest part has an upper edge which is partly or completely closed. The seat area part, on the contrary, covers a seat area formed on the side turned towards the user by a seat cushion and a backrest when the vehicle seat protection film is mounted to a vehicle seat. The seat area part has an open lower edge. Preferably, the vehicle seat protection film consists exclusively and as one piece of the headrest part and the seat area part following directly to it.

While according to the prior art mentioned in the beginning, the seat area part in the upper end portion, in which it is pulled over the upper end area of the backrest, is closed in a cross-section in a circumferential direction to enclose the backrest at least in the upper end portion of the backrest or even to be able to be stayed against it, the invention suggests that the cross-section of the vehicle seat protection film is not closed in the circumferential direction (and therefore the cross section has an open edge) over the entire longitudinal extension of the seat area part. Especially in the upper end portion of the seat area part, in which it is applied to the upper end portion of the backrest, therefore the cross-section of the vehicle seat protection film has an open edge. The consequence of this design is that according to the invention the seat area part of the vehicle seat protection film does not have to be "pulled onto" the backrest, but rather is configured open in the circumferential direction, in which way an unfolding of the seat area part is also possible and a laying onto or mounting of the seat area part to the vehicle seat is made possible.

This is possible independently of the lateral extension of the backrest and the vehicle seat. While according to prior art the vehicle seat protection film in its flattened state had to have at least a lateral extension corresponding to the width of the vehicle seat, especially of the upper end portion of the backrest, due to the use of the cross-section of the seat area part with the open edge smaller lateral extensions of the vehicle seat protection film in its flattened state can also be used. For such smaller lateral extensions, too, the seat area part can then be unfolded as the vehicle seat protection film is applied to the vehicle seat, so that in spite of the smaller lateral extension an increased lateral width of the vehicle seat can be covered.

It is possible that the backrest parts in the flattened state have no overlap with each other and form only a slit caused by the incision. It is also possible, however, that before the creation of a weld seam for creating an overlap or for creating an interspace between the back layer parts, the back layer parts are pushed over one another or pulled apart from one another.

For one embodiment of the invention, the cross-section of the tube formed by the vehicle seat protection film is not closed in the circumferential direction over the entire longitudinal extension between the upper edge and the lower edge of the vehicle seat protection film. This means that (in deviation to the prior art mentioned in the beginning) no upper end portion 11 is present, in the area of which a pocket 16 closed in the circumferential direction is present. In this way the inventive vehicle seat protection film is a move away from the prejudice of the person skilled in the art that for fixing the vehicle seat protection film to the vehicle seat even at a "wiggling around" of the user on the seat protected by the vehicle seat protection film e.g. at getting into or out of the vehicle it is obligatory that the vehicle seat protection film with a pocket with closed edge be mounted to the vehicle seat. Rather than that, the invention realized for the first time that sufficient fixing of the vehicle seat protection film to the vehicle seat is also possible when the opening of the back layer extends over the entire length between the upper and the lower edge so that an upper pocket with an open edge results. In this case, laterally inner edges of back layer parts oriented in the longitudinal direction of the mentioned opening can be spread apart. In this way with an increasing distance from the upper edge the overlap of the front layer with the back layer parts gets smaller (or in other words laterally outer part regions of the back layer parts are aligned in a plane to parts of the front layer). In this way the spreading apart as explained leads to the formation of a pocket with open edges in the upper end portion of the vehicle seat protection film, the inner cross-section of which increases with increasing distance from the upper edge. The pocket with the open edge formed according to the invention is therefore realized with a taper in the direction towards the upper edge at the explained spreading apart of the back layer parts. This tapered realization of the pocket with the open edge can, however, be used advantageously to enable a use of the vehicle seat protection film for vehicle seats and especially headrests and/or upper end portions of the backrest with different cross-sections, where for smaller cross-sections of the backrest and/or the headrest the headrest and/or backrest can then enter further into the tapered pocket with the open edge than this is possible for larger cross-sections. It is also possible that with the tapered upper pocket with the open edge a kind of centering device for insertion is provided which simplifies the pulling of the vehicle seat protection film onto the vehicle seat or the headrest. Finally, the formation of the upper pocket of a vehicle seat protection film according to prior art with a closed edge requires a very meticulous, well-fitting pushing of the upper pocket onto the upper end portion of the backrest, which requires great care and takes up much time. The formation of the upper pocket with an open edge, on the contrary, poses lower requirements on the pulling of the upper pocket onto the headrest and/or the upper end portion of the backrest.

For a further embodiment of the vehicle seat protection film, the headrest part and the seat area part are formed by a front layer and two back layer parts, which are connected to the front layer in the region of their lateral outer edges. Laterally inner edges of the back layer parts can be opened in such a way that the headrest part can be applied to a headrest of the vehicle seat, while the seat area part can be applied to a seat area of the vehicle seat, which is preferably done by simple "laying down". In the region of the side areas of the backrest and the seat cushion as well as in front of the seat cushion surplus material of the vehicle seat protection film may extend, by which the side areas and the front side of the vehicle seat can then also be protected. The upper edges of the back layer parts can be connected to the front layer by at least one weld seam. The laterally inner edges of the back layer parts, which are moved apart for the opening of the back layer, for this embodiment extend up to the weld seam. This embodiment is based on the finding that for prior art with the incision 8 not extending over the entire back layer 3 the danger of the advancement of a tear from the incision end 10 at spreading apart of the edges 14, 15 is great, so that according to prior art the use of a reinforcing element 22 may be necessary to hinder the advancement of the tear. The application of the reinforcing element 22 poses an additional investment of material and necessitates an additional production step. Additionally, according to prior art, the reinforcing element 22 is made e.g. from a PP material to be glued onto the vehicle seat protection film 1 or a paper to be glued onto the vehicle seat protection film 1, in which way the recycling of the vehicle seat protection film 1 is made more difficult, because possibly it is no longer made of one material. This finding is considered by the invention by a design wherein the end portions of the laterally inner edges of the back layer parts do not end in a "normal" material region of the plastic film, but in the region of the weld seam. In this way, according to the invention use is made of the fact that in the region of the weld seam due to the heat treatment of a heat welding or due to a cold welding possibly the material increases in hardness, which provides an increased tear resistance. If the weld seam is created with an additional welding material, even additional material in the region of the weld seam can be used for increasing the tear resistance.

It is generally possible that the laterally inner edges of the back layer parts are arranged in immediate neighborhood with each other. This would correspond to an embodiment according to the prior art explained in the beginning, in which, however, the incision 8 extends continuously up to the upper edge 6 and to the weld seam. For a different embodiment, at least in a part region of the longitudinal extension of the weld seam by the weld seam three layers are welded to each other. Here, one welded layer is provided by the front layer, whereas the two other welded layers are realized by overlapping part regions of the back layer parts. This embodiment is e.g. advantageous when in a non-spread state the vehicle seat protection film is to have a low lateral extension while with the unfolding of the back layer parts in the region of the seat area still a comparably large width of the vehicle seat protection film is to be provided. On the other hand, with the overlap of the back layer parts it can be achieved that even with the spreading of the laterally inner edges of the back layer parts an overlap is provided directly adjacent to the upper edge. Due to the overlap (in spite of the design of the upper pocket with an open edge the headrest and/or the upper end portion of the backrest is completely enclosed in a circumferential direction by the vehicle seat protection film.

It is also possible, however, that the laterally inner edges of the back layer parts in the region of the at least one weld seam are arranged with a distance from each other, in which way with a comparatively small circumferential extension of the edge of the upper pocket with the open edge (and therefore low investment of material) a comparatively large width of the upper pocket having the open edge can be provided.

It is possible that the vehicle seat protection film is made from a plastic film of more than one part, where individual plastic film parts may be adapted specifically to the desired functions, especially the gliding characteristics with respect to the vehicle seat and/or with respect to the person sitting on the vehicle seat and the vehicle seat protection film, the tear resistance, the coloring, the permeability to air, the elasticity and similar. Preferably, the individual plastic film parts of the one-piece plastic film are bonded substance-to-substance, that is, welded or glued to each other.

It is possible that the plastic film is formed with a single layer. Preferably, however, a multi-layer film (such as a two-layer film, three-layer film, . . . ) is employed. The individual layers may be purposely adapted to intended functions. For example, a layer turned towards the vehicle seat may consist of a material which guarantees a good adhesion of the vehicle seat protection film to the vehicle seat. Contrary to that, for this example a layer turned towards the person may consist of a material which is especially skin-friendly and/or enables an easier gliding on the vehicle seat protection film. If at least one middle layer is present, this middle layer can for example be made purposely of a material which provides a high strength, especially a high stability against tears.

In a further embodiment, the vehicle seat protection film is provided with a larger adhesion on the side turned towards the seat area and the headrest than on the other side. In this way, e.g. the friction on this side can be selectively heightened, which can be done by the choice of contact material, an additional coating, a suitable choice of surface roughness or a so-called Corona treatment as described in the document DE 101 32 242 A1. It is also possible that the adhesion is heightened by a selective electrostatic charging of the vehicle seat protection film. The measures mentioned can apply to the entire contact area of the vehicle seat protection film with the vehicle seat or at least a part of the same.

It is generally possible that the lateral extension of the front layer is about 80 cm, as this is the case for the prior art mentioned in the beginning. For prior art embodiments this is compulsory to enable pushing the upper pocket of the vehicle seat protection film with the closed edge over the upper end portion of the backrest. According to the invention, this demand on the dimensioning of the vehicle seat protection film might no longer exist. According to one embodiment of the invention therefore the vehicle seat protection film can be formed with a lateral extension of the front layer which is smaller than the width of the backrest of the vehicle seat in its upper end portion. For example, the lateral extension of the front layer can be less than 50 cm or even less than 40 cm. If the front layer (and therefore the vehicle seat protection film in the stored and to-be-transported state) has a lateral extension of less than 50 cm or even less than 40 cm, a transport and storing of packaging or rolls with vehicle seat protection covers is possible in an especially compact way, which is especially true for the transport and/or the storing on Euro-pallets, which have standardized dimensions of 100 cm×80 cm.

It is also possible that the lateral extension of the front layer is smaller than half of the circumference of the headrest. It is also possible that the sum of the lateral extension of the front layer and the back layer parts is smaller than 100 cm (especially smaller than 95 cm, 90 cm or even 80 cm).

A further solution of the object of the invention is given by a method for producing a vehicle seat protection film of the kind explained before. In such a method a tube of a plastic film (with closed edge in cross-section) is produced. Subsequently, a back-oriented layer of the tube is separated into the two back layer parts by a cut while the front-oriented layer is not cut and forms the front layer. Subsequently, the region of the upper edge with the front layer and the back layer parts is welded.

For an alternative method of production at first a plastic film is produced as a flat film. To mention only a non-limiting example, several flat films processed in several parallel sheets can also be produced by side or central longitudinal cuts of a tube of a plastic film. Side edges of the plastic film, which are to form the back layer parts, are then folded in a following method step, where after the folding the laterally inner edges of the back layer parts turned towards each other can directly neighbor one another, form an interspace or form an overlap. Subsequently, the welding of the front layer and the back layer parts is induced.

Within the frame of the invention a "one-by-one-production" of the vehicle seat protection films is possible. However, preferably the vehicle seat protection films are produced in a continuous production process. In order to do this, at least one sheet for several vehicle seat protection films arranged one after the other is produced by use of the method steps explained before. Adjacent to the weld, then a separating cut running in a transverse direction or a transverse perforation is produced, where the separating cut or the transverse perforation can then separate the different vehicle seat protection films of this sheet.

Advantageous developments of the invention result from the claims, the description and the drawings. The advantages of features and of combinations of a plurality of features mentioned at the beginning of the description only serve as examples and may be used alternatively or cumulatively without the necessity of embodiments according to the invention having to obtain these advantages. Without changing the scope of protection as defined by the enclosed claims, the following applies with respect to the disclosure of the original application and the patent: further features may be taken from the drawings, in particular from the illustrated designs and the dimensions of a plurality of components with respect to one another as well as from their relative arrangement and their operative connection. The combination of features of different embodiments of the invention or of features of different claims independent of the chosen references of the claims is also possible, and it is motivated herewith. This also relates to features which are illustrated in separate drawings, or which are mentioned when describing them. These features may also be combined with features of different claims. Furthermore, it is possible that further embodiments of the invention do not have the features mentioned in the claims.

The number of the features mentioned in the claims and in the description is to be understood to cover this exact number and a greater number than the mentioned number without having to explicitly use the adverb "at least". For example, if an element is mentioned, this is to be understood such that there is exactly one element or there are two elements or more elements. Additional features may be added to these features, or these features may be the only features of the respective product.

The reference signs contained in the claims are not limiting the extent of the matter protected by the claims. Their sole function is to make the claims easier to understand.

Other features and advantages of the present invention will become apparent to one with skill in the art upon examination of the following drawings and the detailed description. It is intended that all such additional features and advantages be included herein within the scope of the present invention, as defined by the claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention. In the drawings, like reference numerals designate corresponding parts throughout the several views.

DETAILED DESCRIPTION

Within the frame of description of the invention, a longitudinal axis 23 refers to a connecting axis of the headrest-side end of the vehicle seat protection film 1 to the end of the vehicle seat protection film 1, which is arranged in the region of the front end portion of the seat cushion 18. When the vehicle seat protection film 1 is in use, the longitudinal axis 23 of the vehicle seat protection film 1 therefore extends in the region of the seat cushion 18 roughly along the longitudinal axis of the vehicle, while in the region of the backrest 19 the longitudinal axis 23 is inclined with respect to the vertical direction corresponding to the inclination of the backrest 19. Without this necessarily having to be the case, the longitudinal axis 23 corresponds to the conveying direction of the vehicle seat protection film 1 during the different production steps and/or a sheet 25 with several vehicle seat protection films 1 is rolled up along a longitudinal axis 23 and/or several vehicle seat protection films 1 are oriented in the direction of the longitudinal axis 23 arranged one behind the other in a sheet 25. On the contrary, a lateral direction 24 refers to a direction transverse to the longitudinal axis 23. When applying the vehicle seat protection film 1 to a vehicle seat 17, the lateral direction 24 is oriented in a transverse direction of the vehicle. With respect to the use of the vehicle seat protection film 1, "front" refers to an orientation in the direction of movement of the vehicle or a side facing towards the user, while "back" refers to a side oriented against the direction of movement of the vehicle or a side oriented away from the user sitting on the vehicle seat 17. With "top"/"up" reference is made to the part of the vehicle seat protection film 1 which is designed for covering the headrest 20 and/or the upper end portion of the backrest 19, while "bottom"/"low" refers to the part of the vehicle seat protection film 1 which is designed for covering the front end portion of the seat cushion 18.

Figure 4:
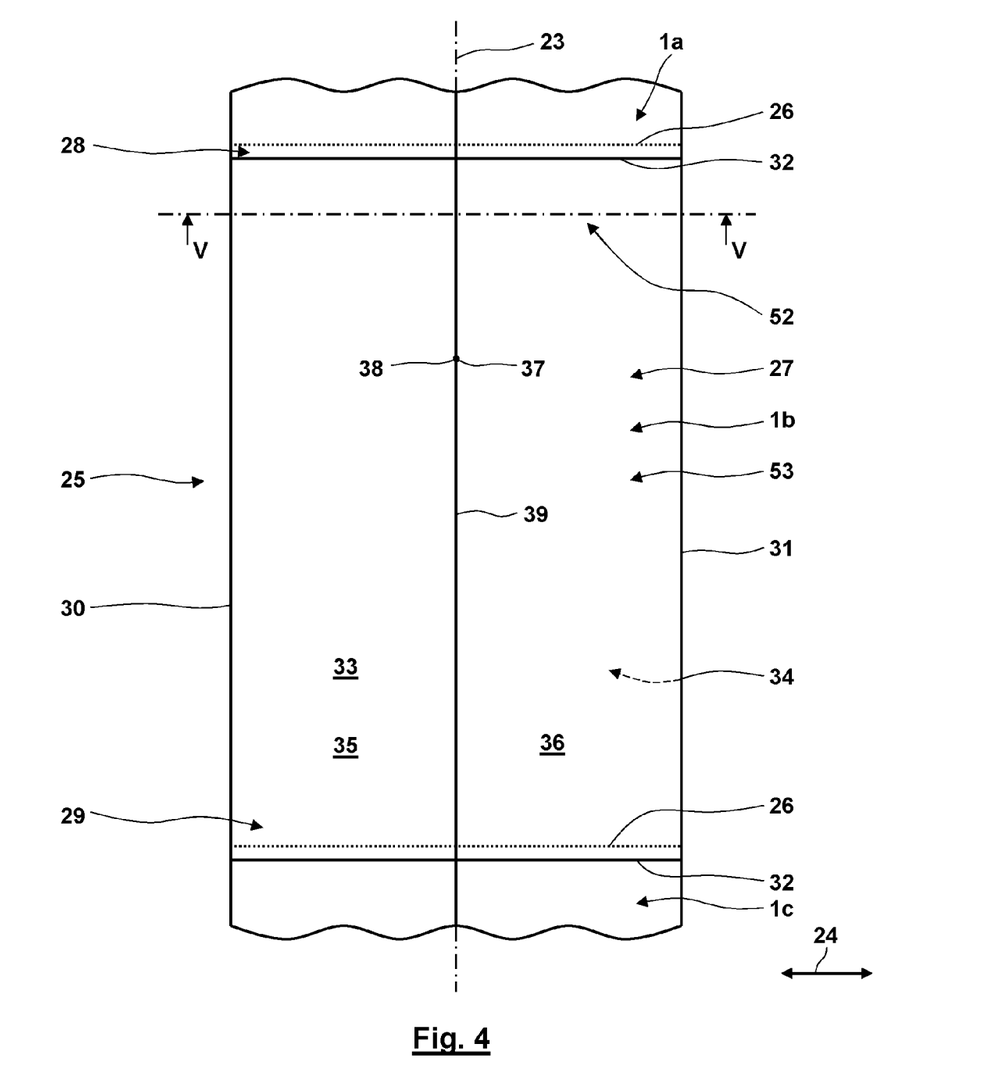
FIGS. 4 to 11 each show a top view and an associated cross-section of vehicle seat protection films according to the invention.
Figure 5:
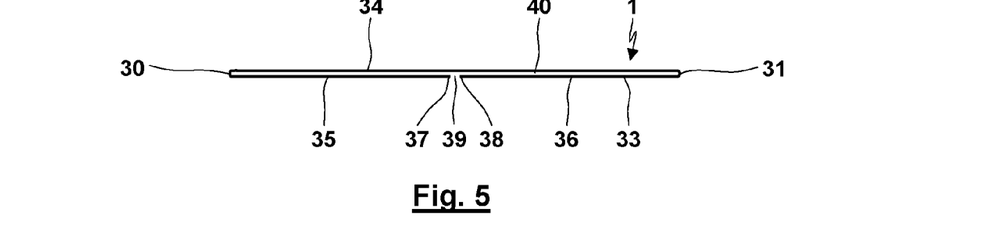

In FIG. 4, a sheet 25 is shown in which in the direction of the longitudinal axis 23 several vehicle seat protection films 1a, 1b, 1c, . . . lying one after the other are connected to each other via transverse perforations 26 (which are marked with dotted lines). FIG. 4 shows the vehicle seat protection films 1 from a rear side. The vehicle seat protection films 1 are formed by a tube 27, which is shown in a flattened state here. In this state the vehicle seat protection films 1 exhibit a rectangular outer geometry, which in the region of an upper edge 28 and a lower edge 29 each is limited by a transverse perforation 26 and by laterally outer edges 30, 31. In this state the edges 28-31 are linear. In the region of the upper edge 28, directly adjacent to the perforation 26 (for example in a distance from 0.5 cm to 2 cm) the vehicle seat protection films 1 have a weld seam 32. For the embodiment shown the weld seam 32 extends over the entire width of the vehicle seat protection film 1, without this necessarily having to be the case. The weld seam 32 connects a back layer 33 visible in FIG. 4 with a front layer 34 covered in FIG. 4. The back layer 33 consists of two back layer parts 35, 36. The back layer parts 35, 36 are rectangular. The length of the back layer parts 35, 36 corresponds to the longitudinal extension of the vehicle seat protection films 1 and for the embodiment according to FIG. 4 their width corresponds to half the width of the front layer 34. In the region of the outer edges 30, 31, the back layer parts 35, 36 merge into the front layer 34 due to the tube-like geometry. The back layer parts 35, 36, on the contrary, are limited by laterally inner edges 37, 38, which for the embodiment according to FIGS. 4 and 5 are arranged closely neighboring each other while forming a gap 39. From the lower edge 2 starting from at least the perforation 26 the laterally inner edges 37, 38 and therefore the back layer parts 35, 36 extend up to the weld seam 329 straight and parallel to the longitudinal axis 23. For the embodiment shown, the edges 37, 38 and the gap 39 also continue into the interspace between the transverse perforation 26 and the weld seam 32, so that these are formed continuous over the sheet 25.

As can be seen in the cross-section according to FIG. 5, between the upper edge 28 and the lower edge 29 the vehicle seat protection film forms a pocket 40 with open edge, the cross-section of which does not change between the weld seam 32 and the lower edge 29 (here the transverse perforation 26) in the flattened state shown without pulling apart of the edges 37, 38.

To be employed as attended, a vehicle seat protection film 1 is taken from the sheet 25 by pulling-off of the transverse perforation 26. Then, the edges 37, 38 can be moved apart. Due to the integration of the edges 37, 38 into the weld seam 32 in the region of the upper edge 28 a pocket 40 is still formed with the cross-section according to FIG. 5. With a growing distance from the weld seam 32 the lateral extension of the pocket 40 enlarges. The edges 37, 38 may take the form of an inverted V extending from the weld seam 32. With a growing distance from the weld seam 32, the distance of the edges 37, 38 grows (as long as a pocket with open edge is still formed here) and therefore the lateral extension of the gap 39 grows, too. At sufficient length of the vehicle seat protection film 1, the edges 37, 38 with a sufficient distance from the weld seam 32 can be folded outwards to such an extent that they are arranged in the same plane as the front layer 34. In this way in this longitudinal section of the vehicle seat protection film 1 in a state of use no pocket is formed any more. Rather, this length section of the vehicle seat protection film 1 can then be used as a kind of flat film, which can then be placed on the seat area 21 from above.

In a variation to the embodiment shown in FIGS. 4 and 5, between the transverse perforation 26 and the neighboring weld seam 32 the back layer 33 can be formed without a gap 39 so that the edges 37, 38 directly abut each other.

Figure 6:
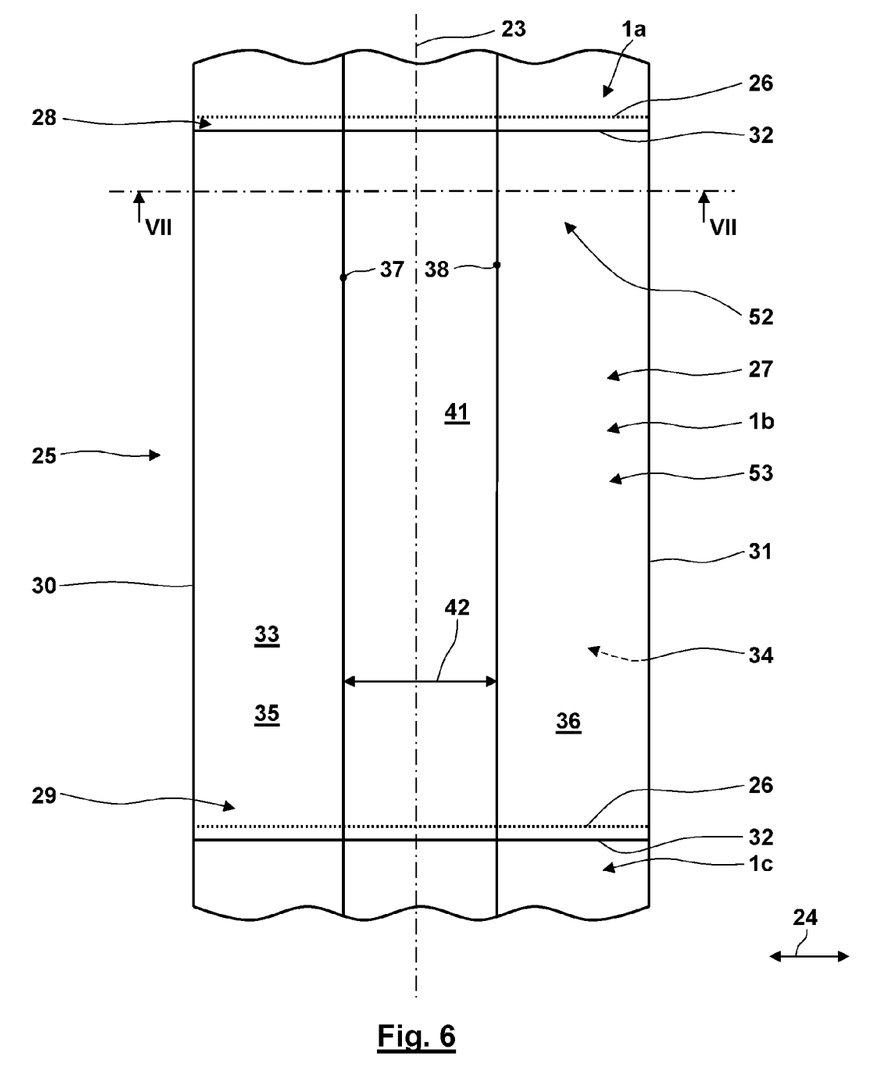
Figure 7:
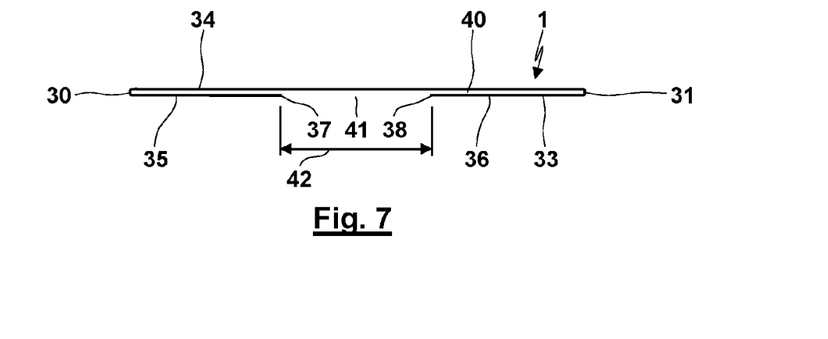

With a formation otherwise according to the embodiment according to FIGS. 4 and 5, for the embodiment according to FIGS. 6 and 7 the edges 37, 38 do not directly abut each other forming a small gap 39. Rather, they are arranged with a distance 42 to each other forming an interspace 41. This results in the pocket 40 with the open edge forming a larger opening of the edge. In this case the circumferential length of the tube 27 (and therefore the lateral extension of the vehicle seat protection film 1 with full unfolding as a flat film) is the double of the lateral extension of the front layer 34 minus the distance 42. Also for this embodiment after the unfolding of the back layer parts 35, 36 a pocket with open edge tapering in the direction towards the weld seam 32 remains, the opening of which enlarges in the direction away from the weld seam 32 in a lateral direction. However, for this embodiment the longitudinal section of the vehicle seat protection film 1 in which the formation of a flat film is possible without forming a pocket here possibly has a larger longitudinal extension when compared to the embodiment according to FIGS. 4 and 5. On the other hand, possibly the expenditure of material for the production of the vehicle seat protection film 1 can be reduced while maintaining the same dimension of the front layer 34.

Figure 8:
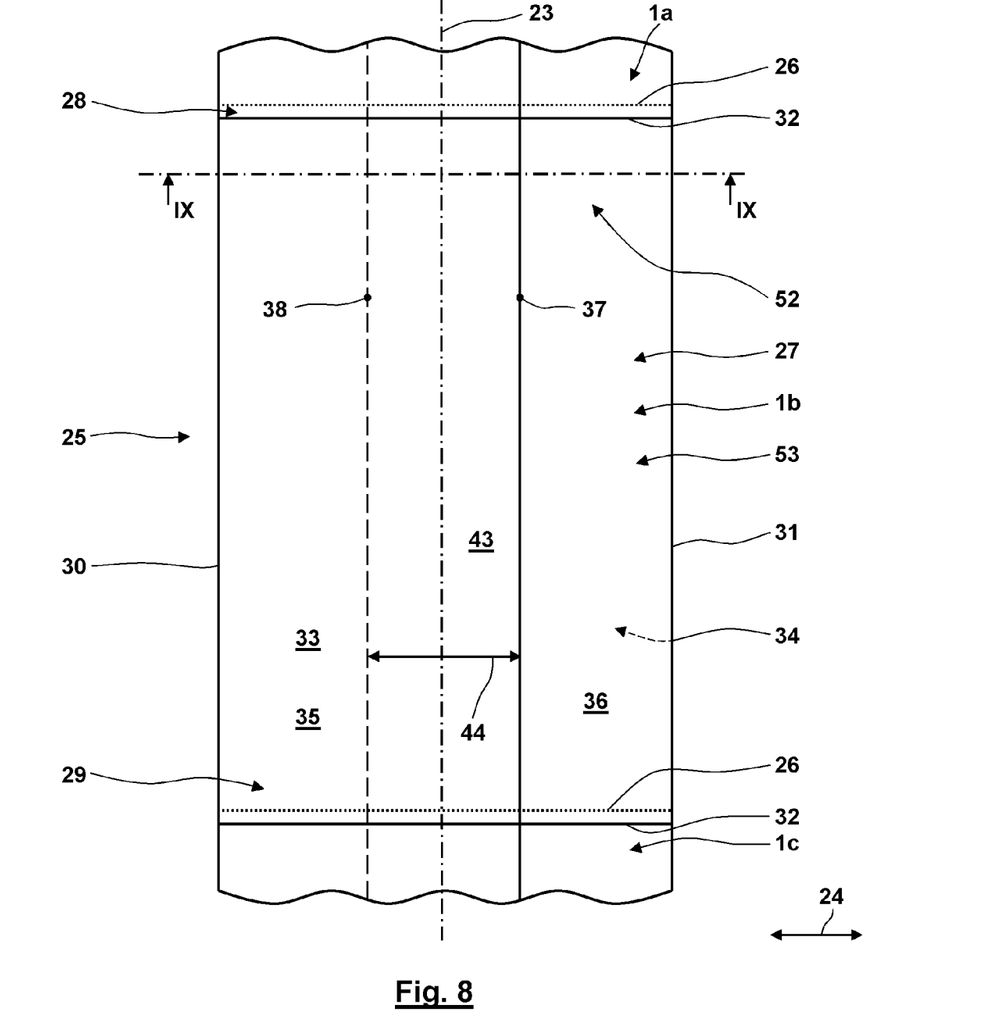
Figure 9:
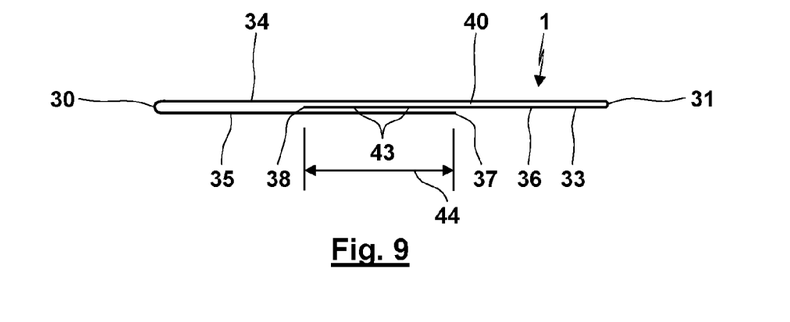

With otherwise corresponding design, according to FIGS. 8 and 9 the back layer parts 35, 36 have an overlap 34 with a transverse extension 44. For this embodiment, the circumferential length of the cross-section (and therefore the lateral extension of the vehicle seat protection film 1 at complete unfolding) corresponds to the sum of the double of the lateral extension of the front layer 34 and the transverse extension 44. In this case, the longitudinal section of the vehicle seat protection film 1 in which a complete unfolding of the back layer parts 35, 36 is possible can have a smaller longitudinal extension than for the embodiments according to FIGS. 4 to 7. In FIG. 8, the edge 38 of the back layer part 36 (which is covered by the back layer part 35 due to the overlap 43) is shown with dashed lines.

Figure 10:
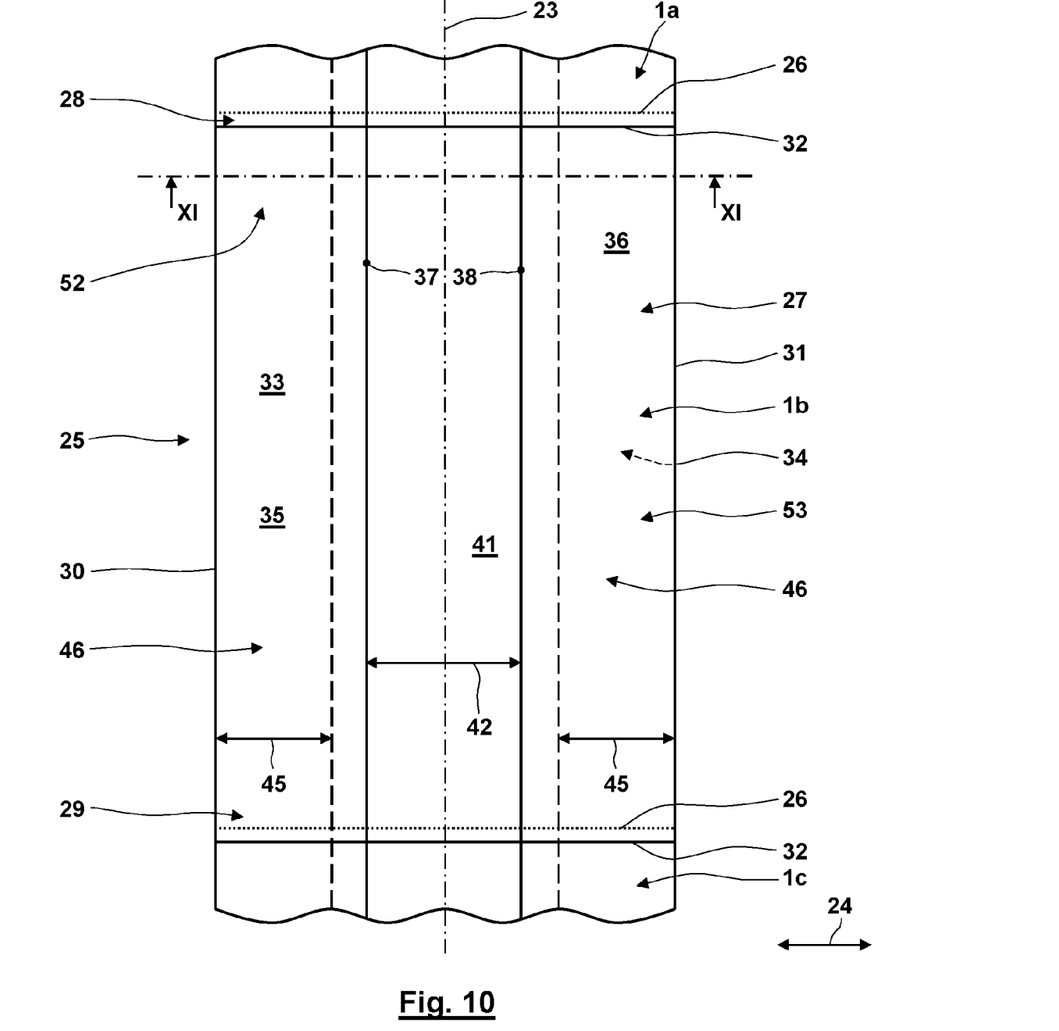
Figure 11:
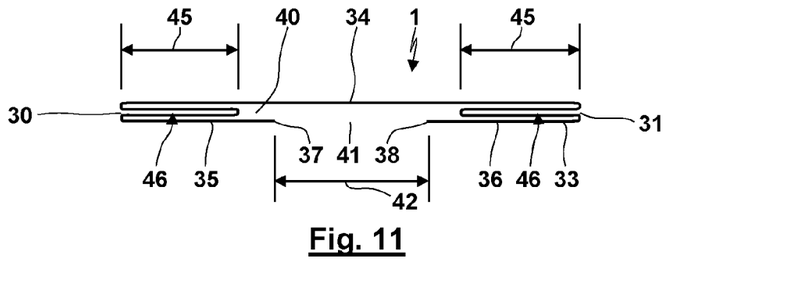

For the embodiment according to FIGS. 10 and 11, the back layer parts 35, 36 are folded back and forth several times with an extension 45 of the folds 46. The edges 37, 38 (while forming an interspace 41) have a distance 42. The edges 37, 38 are arranged laterally on the inner side from the folds 46. It is possible, however, that in a variation with respect to the embodiment according to FIGS. 10 and 11 the back layer parts 35, 36 in addition to the folds 46 have an overlap.

Any dimensions of the vehicle seat protection film 1 are possible. The vehicle seat protection film 1 in these cases usually has a larger longitudinal extension than for the embodiments shown. For an embodiment with a design of the vehicle seat protection film 1 according to FIGS. 8 and 9, the vehicle seat protection film 1 is made of a plastic film. The circumferential length or full lateral extension in an unfolded state of this plastic film is 900 mm, while the lateral extension of the front layer 34 is 350 mm, so that a lateral extension of the back layer parts 35, 36 of 275 mm each results. Deviations of the circumferential length of ±20 mm, especially ±10 mm, with at the same time possible deviations from the lateral extension of the back layer parts 35, 36 by ±75 mm, especially ±50 mm, are also possible. For this embodiment, the extension of the vehicle seat protection film 1 in the direction of the longitudinal axis 23 is 1600 mm, where also deviations from this longitudinal extension by ±100 mm, especially ±50 mm, are possible. The vehicle seat protection film 1 is preferably produced of a plastic film with a thickness in the region of 6 μm to 40 μm, especially 10 μm to 20 μm, e.g. 12 μm. It is also possible that a plastically deformed plastic film is used, where by the plastic deformation e.g. a thickness of the plastic film may be further reduced, in which way the expenditure of material can be reduced and/or due to the plastic deformation the stability of the plastic film is influenced.

Figure 12:
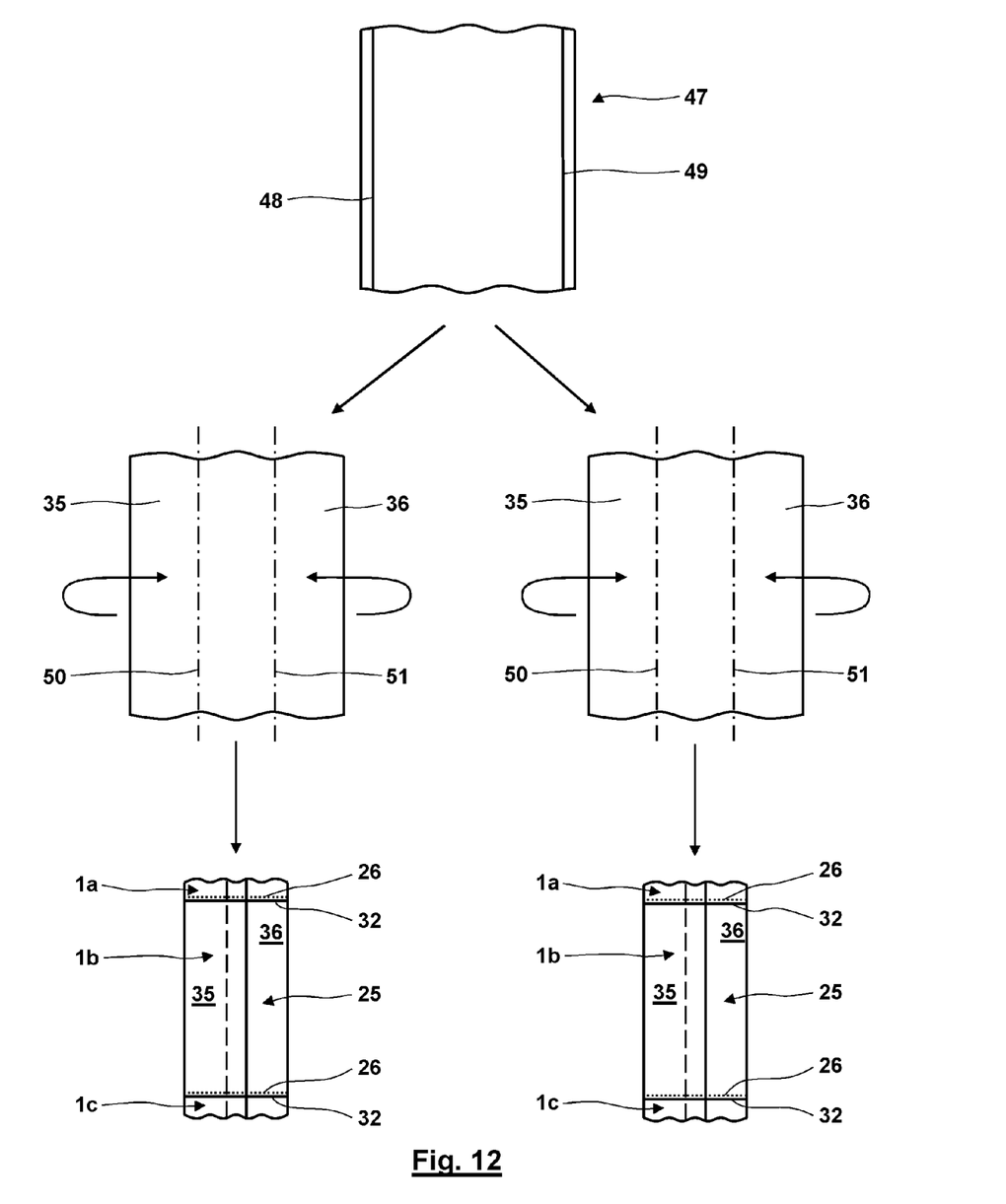
FIG. 12 shows a method for a continuous production of vehicle seat protection films.

FIG. 12 shows an embodiment for the production of a sheet 25 with vehicle seat protection films 1. In a first step in a continuous extrusion process a tube 47 of a plastic film is produced. In the region of the lateral edges of the flattened tube 47 then longitudinal incisions 48, 49 are made. Thus two continuous sheets of flat film remain. The width of the sheets corresponds to a lateral extension of the vehicle seat protection film 1 in an unfolded state. (In deviation to FIG. 12, the longitudinal incisions 48, 49 each can cut through the plastic film at the side edges with a single cut.) The resulting two layers of the plastic film are processed as shown in parallel processing lines. In a subsequent step, the later back layer parts 35, 36 are folded along the fold lines 50, 51. Finally, in subsequent steps the weld seam 32 and the transverse perforation 26 are formed. During the production, the longitudinal axis 23 of the vehicle seat protection films 1 corresponds to the conveying direction of the plastic film, where the fold lines 50, 51 are oriented in parallel to the conveying direction.

The person skilled in the art will see from FIG. 12 that further longitudinal incisions can also be made into a then larger tube 47, from which then more than two sheets of the plastic film to be processed in parallel result.

It is possible that before, during or after the mentioned method steps a printing of the plastic film is provided. It is possible that the printing gives instructions to the user of the vehicle seat protection film 1 for the use of the vehicle seat protection film 1. It is also possible that by the printing it is made obvious which side of the vehicle side protection film 1 is an adhesive, slip-resistant side, which preferably should be oriented towards the vehicle seat.

In a production method according to FIG. 12 (or a different production method) the plastic film can be provided as a flat film or a flat film sheet, which is especially advantageous for a printing of the plastic film and/or an intermediate storage of the plastic film.

In an upper end portion, the vehicle seat protection film 1 forms a headrest part 52, which can be applied to the headrest 20. In the region of the headrest part 52 even at an unfolding of the back layer parts 35, 36 a pocket with a cross-section with an open edge remains. The headrest part 52 ends in the upper end portion of the backrest 19 if the vehicle seat protection film 1 is applied to the vehicle seat 17 as intended. Furthermore, the vehicle seat protection film 1 forms a seat area part 53 adjacent to the headrest part, which can be applied to a seat area 21 of the vehicle seat 17. Especially, the seat area part 53 has a longitudinal section in which a full unfolding of the back layer parts 35, 36 resulting in a flat film is possible.

For the embodiment according to FIGS. 4 and 5, the weld seam 32 substantially connects two layers while in the region of the gap 39 the weld seam 32 is interrupted or present only on one layer. For the embodiment according to FIGS. 6 and 7, the weld seam 32 in the region of the backrest parts 35, 36 connects two layers while in the region of the interspace 41 the weld seam 32 is interrupted or only produced at the front layer 34. For the embodiment according to FIGS. 8 and 9 by the weld seam 32 in the region of the overlap 43 three layers are welded to each other while to the side of the overlap 43 only two layers are connected via the weld seam 32. For the embodiment according to FIGS. 10 and 11 in the region of the folds 46 there is a welding of four layers, where at additional folds a welding of more layers may occur. Between the folds 46 and the edges 37, 38, the weld seam 32 here connects only two layers. In the region of the interspace 41, the weld seam 32 is interrupted or only produced at the front layer 34. It is also possible that the weld seam 32 is interrupted as long as the weld seam connects the edges 37, 38 to the front layer 34.

For the embodiments shown, the vehicle seat protection film 1 is produced with a rectangular outer geometry with straight-lined edges 37, 38, straight-lined transverse perforation 26 and straight-lined weld seam 32 oriented in the lateral direction. Any different geometries are also possible within the frame of the invention.

When the width of the front layer 34 is chosen roughly corresponding to the width of the headrest 20 (or 10 mm or 20 mm wider than the width of the headrest), the use of the vehicle seat protection film 1 leads to the vehicle seat protection film 1 lying close against the headrest 20. A view back to the side of the headrest 20 is not obstructed by excess material regions of the vehicle seat protection film 1, as this is the case for embodiments according to prior art in which the lateral extension of the front layer 34 corresponds to the width of the vehicle seat 17.

If a plastic film with several layers is employed, as a smooth material for the front side turned towards the user e.g. MDPE or HDPE may be employed. It is also possible that for the layer turned towards the user an LDPE is used to which a strong antiseize and/or an antiseize in a high concentration is added. If at least one middle layer is present, this can be optimized for providing a high tear resistance. For this, especially LLDPE, HDPE and/or MPDE are/is employed. On the contrary, for a lower layer turned towards the vehicle seat, a material for providing a higher adhesion than for the layer turned towards the user is employed. It is possible that an LLDPE without the addition of an antiseize is employed. It is also possible that several layers have the same thickness or have different thicknesses, where e.g. a middle layer can have a higher thickness than the outer layers. For each of the layers the use of any other material, e.g. PP, PA or EVA is possible.

It is furthermore possible that by the printing or by the choice of material for one layer different sides of the plastic film have optically differing designs. It is e.g. possible that the different sides have different colors. It is alternatively or cumulative possible that the different sides have a different brilliance (realized as dull or shining to a different amount). With the colors and/or brilliance it can be made visible for the user e.g. which side of the vehicle seat protection film 1 is the inside and the outside.

It is possible that the vehicle seat protection film 1 is transparent, partially transparent or not transparent. This might apply both for a colored as well as for a non-colored embodiment.

It is furthermore possible that the vehicle seat protection film 1 is realized to be white. This possibly causes an optical effect which makes the vehicle seat protection film 1 appear thicker. Furthermore, a white vehicle seat protection film 1 possibly appears especially clean. Possibly the white embodiment of the vehicle seat protection film can also be used to make soiling especially well-visible.

If a rolling-up of the sheet 25 into a roll for storage and/or transport of the vehicle seat protection films 1 is desired and the differing number of layers and the resulting different thicknesses of a winding is objectionable, before rolling-up of the layers 25 an additional supporting fold can be made for example in an edge region.

For the embodiments shown, the vehicle seat protection film 1 is mirror-symmetric to the longitudinal axis 23 shown schematically so that the edges 37, 38 have the same distance from the longitudinal axis 23 and run into the weld seam 32 with the same distance from the edges 30, 31. This is not necessarily the case. It is, however, possible that the edges 37, 38 for different distances from the corresponding edges 30, 31 run into the weld seam 32. To mention only a non-limiting example, the invention also encompasses an embodiment in which differing to the embodiment according to FIGS. 4 and 5 with basically the same design the gap 39 is arranged in the region of one of the edges 30, 31 so that the tube-like plastic film in the cross-section according to FIG. 5 is not slit centrally but to the side.

Many variations and modifications may be made to the preferred embodiments of the invention without departing substantially from the spirit and principles of the invention. All such modifications and variations are intended to be included herein within the scope of the present invention, as defined by the following claims.

I claim:

1. Vehicle seat protection film from plastic film having a thickness of less than 80 μm, the vehicle seat protection film comprising
   a) a headrest part which covers a headrest if the vehicle seat protection film is applied to a vehicle seat and which has an at least partially closed upper edge and
   b) a seat area part which covers a seat area if the vehicle seat protection film is applied to the vehicle seat and which comprises an open lower edge,
   c) the headrest part and the seat area part comprising a front layer and a right back layer part and a left back layer part being connected to the front layer at lateral outer edges of the right back layer part and of the left back layer part, the right back layer part and the left back layer part being limited by laterally inner edges and the length of the right back layer part and of the left back layer part corresponding to the longitudinal extension of the vehicle seat protection film and
   d) wherein over the entire longitudinal extension between the open lower edge and at least one weld seam extending along the upper edge a cross-section of the vehicle seat protection film is not closed in circumferential direction so that it is possible to open laterally inner edges of the right back layer part and of the left back layer part in such a way that
      da) the headrest part can be applied to the headrest of the vehicle seat and
      db) the seat area part can be applied to the seat area of the vehicle seat and
   e) wherein upper edges of the right back layer part and of the left back layer part are connected to the front layer via the at least one weld seam, where the laterally inner edges of the right back layer part and of the left back layer part extend up to the weld seam.

2. Vehicle seat protection film according to claim 1, wherein the right back layer part and the left back layer part are arranged with an overlap and in at least a part region of the longitudinal extension of the weld seam by the weld seam three layers formed by the front layer, the right back layer part and the left back layer part are welded with each other.

3. Vehicle seat protection film according to claim 2, wherein the sum of the lateral extensions of the front layer, the right back layer part and the left back layer part is smaller than 100 cm.

4. Vehicle seat protection film according to claim 1, wherein in the region of the at least one weld seam the laterally inner edges of the right back layer part and of the left back layer part are arranged with a distance from each other.

5. Vehicle seat protection film according to claim 1, wherein the vehicle seat protection film consists of a one-piece plastic film.

6. Vehicle seat protection film according to claim 5, wherein the plastic film is a multi-layer film.

7. Vehicle seat protection film according to claim 1, wherein the vehicle seat protection film comprises a larger adhesion on a side turned towards the seat area than on an opposite side.

8. Vehicle seat protection film according claim 1, wherein a lateral extension of the front layer is smaller than a lateral extension of the backrest of the vehicle seat.

9. Vehicle seat protection film according to claim 8, wherein the lateral extension of the front layer corresponds to about half the circumference of the headrest in an upper end portion of the headrest or is smaller than half the circumference of the headrest in the upper end portion of the headrest.

10. Vehicle seat protection film according to claim 8, wherein the sum of the lateral extensions of the front layer, the right back layer part and the left back layer part is smaller than 100 cm.

11. Vehicle seat protection film according to claim 9, wherein the sum of the lateral extensions of the front layer, the right back layer part and the left back layer part is smaller than 100 cm.

12. Vehicle seat protection film according to claim 1, wherein the sum of the lateral extensions of the front layer, the right back layer part and the left back layer part is smaller than 100 cm.

13. Method for producing the vehicle seat protection film according to claim 1, wherein
   a) a tube of a plastic film is produced,
   b) a back-oriented layer of the tube is separated into the right back layer part and the left back layer part while the front-oriented layer of the tube forms the front layer,
   c) the weld seam is produced which connects the front layer to the right back layer part and the left back layer part.

14. Method according to claim 13, wherein
   a) the vehicle seat protection film is produced in a continuous production process and
   b) adjacent to the weld seam a separating cut running in a transverse direction or a transverse perforation is produced.

15. Method for producing the vehicle seat protection film according to claim 1, wherein
   a) a plastic film is produced in the form of a flat film,
   b) side edges of the plastic film which form the right back layer part and the left back layer part are folded along fold lines,
   c) the weld seam is produced which connects the front layer to the right back layer part and the left back layer part.

16. Method according to claim 15, wherein
   a) the vehicle seat protection film is produced in a continuous production process and
   b) adjacent to the weld seam a separating cut running in a transverse direction or a transverse perforation is produced.

* * * * *